Dec. 13, 1966 R. F. CARELLA 3,290,783

REPRODUCING APPARATUS

Filed April 29, 1965

INVENTOR.
Richard F. Carella
BY
W. S. Pettigrew
ATTORNEY 3,290,783
Patented Dec. 13, 1966

3,290,783

REPRODUCING APPARATUS

Richard F. Carella, Mount Clemens, Mich., assignor to General Motors Corporation, Detroit, Mich., a corporation of Delaware Filed Apr. 29, 1965, Ser. No. 451,884
4 Claims. (Cl. 33—23)

This invention relates to reproducing apparatus and more particularly to apparatus for reproducing surface outlines of three-dimensional objects.

It is common in the design evolution of many manufactured articles having particular appearance or aesthetic qualities that they are first embodied in a model of wood, clay or other material. The usual next step or steps is of course to transpose from such models into two dimensional drawings suitable for the fabrication of the mass production tools. While templates, optical or similar known methods are generally quite satisfactory to achieve this transposition, such methods are often prohibitively expensive or time consuming, as for example, where quick preliminary drawings are required right in the styling studio while the model is still in progress. The present invention provides relatively simple apparatus for effecting such transposition with minimum expense and labor, while yet achieving a high degree of accuracy and flexibility to many applications.

It is a primary object of this invention to provide a new and improved apparatus for reproducing surface outlines of a three-dimensional model or other object.

It is a further object of this invention to provide a new and improved manual reproducing apparatus including motion duplicating pantograph means operably interconnecting a scanning follower unit movable in a selected plane of the model with a reproducer unit capable of making an image on paper or other suitable agent.

It is yet another object of this invention to provide reproducing apparatus according to the foregoing, wherein the follower and the reproducer units each include a manipulable stylus or similar element mounted for movement in the selected plane relative to a supporting arm which is in turn bodily movable in said plane relative to the model or image paper by the pantograph means, thus effecting compound degrees of freedom within the apparatus enabling convenient reproduction of intricate surface outlines on the model with a great measure of fidelity.

These and other objects, features and advantages of the invention will be readily apparent from the following specification and drawings wherein.

Figures 1, 2:
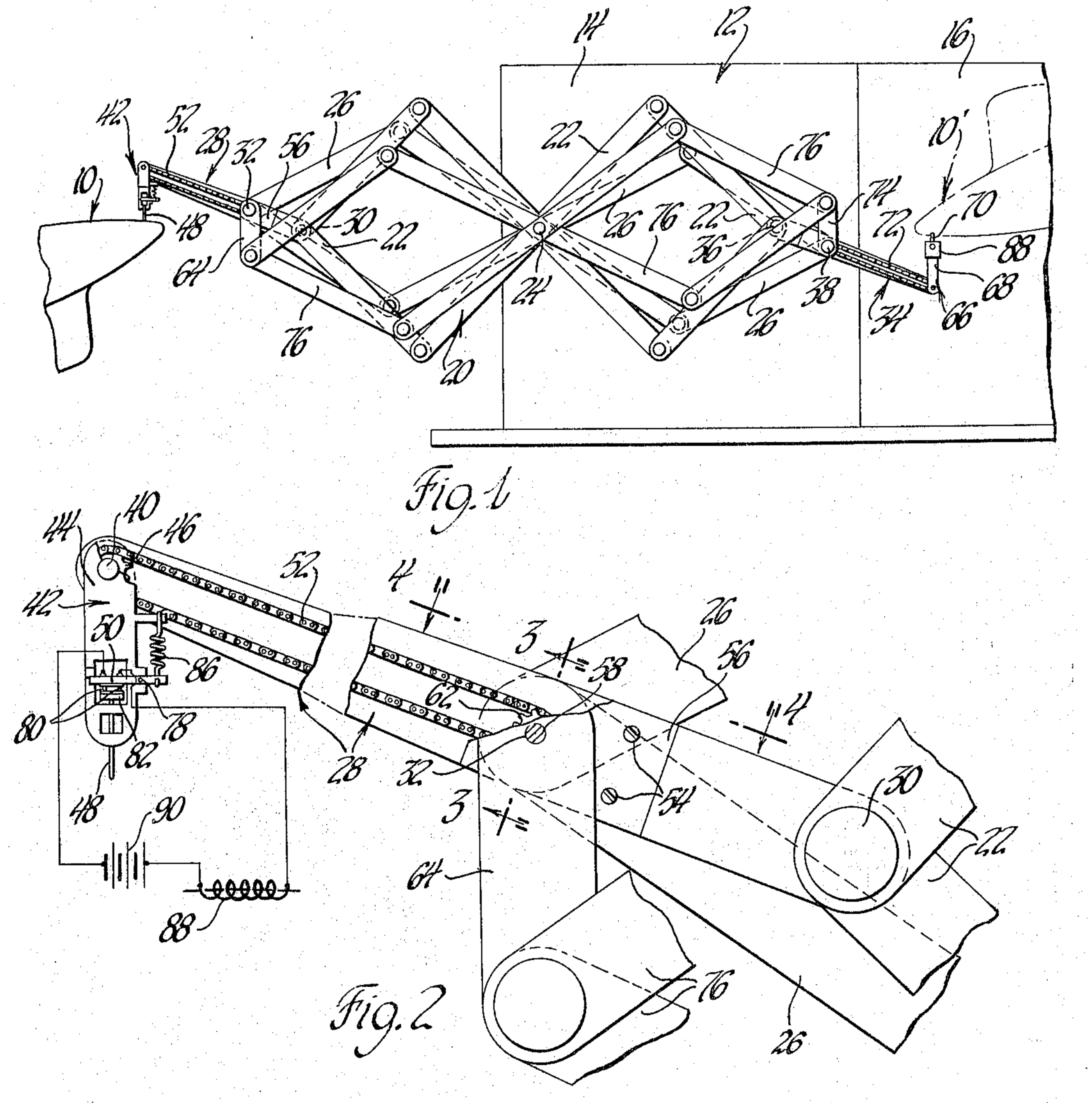
FIGURE 1 is an elevational view of a reproducing apparatus according to this invention.
FIGURE 2 is a fragmentary enlarged view of a portion of FIGURE 1.

Referring now particularly to FIGURE 1 of the drawing, the invention is shown as applied for use in reproducing a selected planar outline of a three-dimensional model of a vehicle body instrument panel structure, the model being designated generally as 10. Located conveniently adjacent the model is a support stand or easel 12 having a first section 14 supporting the reproducing apparatus, and a second section supporting the blank drawing paper sheet 16 or other agent desired to receive the image 10′ of the model.

The reproducing apparatus, designated generally as 20, includes a first pantograph linkage set 22 rotatably mounted on a pivot 24 fixed to easel 12. A second or further similar pantograph linkage set 26 is likewise mounted on pivot 24 for movement independently of pantograph 22. As the construction and operation of a pantograph linkage set is believed to be well understood by those skilled in the art, no particular description thereof is believed necessary.

A follower support arm 28 is rotatably secured at one end thereof to the extreme leftward pivot 30 of pantograph 22 and is further rotatably connected intermediate its ends to the extreme leftward pivot 32 of pantograph 26. Similarly, at the easel end of the apparatus, a like reproducer support arm 34 is rotatably mounted to the extreme rightward pivot 36 of pantograph 22 and connected intermediate its ends to the extreme rightward pivot 38 of pantograph 26. It is apparent that support arms 28 and 34 are thus mounted on the two pantographs for coordinated simultaneous bodily movement relative to pivot 24, and according to pantograph function, the pivot 24 serves as a fixed control point about which the pantographs duplicate selected bodily movement of follower support arm 28 relative to model 10 in movement of the reproducer arm 34 relative to sheet 16.

As shown in FIGURE 2, the free leftward end of follower support arm 28 rotatably receives a pivot stud 40 which mounts a follower assembly 42 including a manipulable lever 44 nonrotatably mounted on stud 40. A stylus 48 is slidably mounted on the lever for coaction with a switch element 50, the purpose of which will later appear. Formed integrally with or secured to stud 40 is a sprocket 46 lying between lever 44 and arm 28, and the sprocket is meshingly engaged within a chain loop 52.

Figure 3:
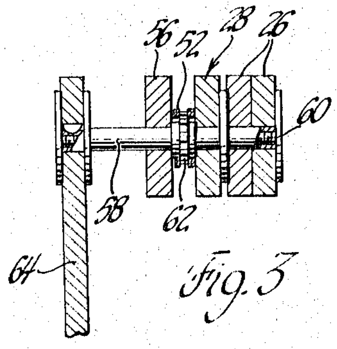
FIGURE 3 is a sectional view taken generally along the plane indicated by line 3—3 of FIGURE 2.
Figure 4:
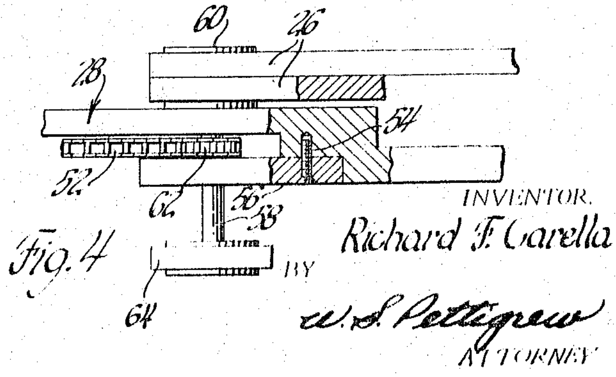
FIGURE 4 is a view taken generally in the direction of arrows 4—4 of FIGURE 2.

Referring to FIGURES 3 and 4, follower support arm 28 adjacent the pivot 32 has secured thereto at 54 a generally L-shaped strap 56 forming a clevis within which is received the other end of chain loop 52. The pivot 32 is formed of an elongated shaft 58, one end of which rotatably receives the leftward members of pantograph 26 for retention by a capped screw fastener 60. The shaft is further received within aligned bores of follower support arm 28 and strap 56, between which is provided a further sprocket 62 secured on shaft 58 and meshingly engaged within the chain loop. A control link 64 is keyed to and secured on the terminal end of shaft 58, the control link being rotatable relative to the follower support arm by the chain loop and sprockets under manual rotation of the lever 44.

Turning to the other end of the apparatus, there is provided on the terminal end of the reproducer support arm a reproducer assembly 66 including a lever 68 suitably adapted at its free end for the reception of a reproducing instrument 70, such as a pencil or the like, extending transversely toward sheet 16. As with the follower and follower support arm previously described, the reproducer assembly 66 is rotatably mounted on the reproducer supchain loop 72. The other end of the chain loop is received in a clevis formed similarly to that of the follower port arm, provided with a sprocket and meshed within a support arm, and is meshingly engaged over a sprocketed shaft, forming the pivot 38 of pantograph 26, to rotatably drive a second control link 74. A further motion duplicating means or third pantograph linkage set 76 is again mounted about the control point of pivot 24 independently of pantographs 22 and 26, and has its extreme leftward and rightward ends rotatably connected to the free ends of control links 64 and 74 respectively. As with the first motion duplicating mechanism provided by pantographs 22 and 26, the pantograph 76 transfers reversely similar rotation to the reproducer assembly 66 about the reproducer support arm upon selected rotation of follower assembly 42 relative to the follower support arm 28.

It is thus seen that in operation, the apparatus of this invention locates the follower support arm 28 and follower assembly 42 for bodily movement in any selected plane of model 10 and that to manipulate the stylus 48 over the contour of model 10 in such plane, there is available not only the free bodily movement of the follower support arm, but additionally, a rotation of the follower assembly relative thereto. Any combination of such motion is of course faithfully transferred as reversely similar rotation to the reproducer assembly 66 and to the reproducer support arm 34. Thus, with two degrees of freedom, so to speak, being available to the stylus tip, it is possible to trace highly intricate contours of the model 10 within any selected plane thereof. With the apparatus disposed as shown, there is no possibility of interference between the apparatus and the model when following a selected contour, such as might occur with prior pantograph type reproducers.

The apparatus of this invention may include provision for an electrical control circuit for the reproducer. As shown in FIGURE 2, the switch element 50 is pivotally mounted at 78 on lever 44 and carries a pair of pin contacts 80 insulated from each other and engageable with a conductive member 82 mounted at the upper end of the stylus 48. A coil tension spring 86 biases the switch element counterclockwise of the lever, so that when there is no pressure on the stylus, only one contact is in engagement with member 82. With a predetermined pressure applied to stylus 48 on model 10, the stylus is moved upwardly against the action of the spring to rotate the switch element 50 clockwise until both contacts engage member 82. With the contacts thus closed to each other, a reproducer control solenoid 88 provided on the free end of reproducer assembly 66 is connected to a battery 90 or other power source so that the solenoid armature is actuated to slidably or otherwise extend the instrument 70 laterally into engagement with the sheet 16. In this way, there are no spurious reproductions on the sheet when the follower assembly is being merely positioned on the model or otherwise.

Thus a new and improved reproducing apparatus is provided.

I claim:

1. Apparatus for reproducing surface outlines from a three-dimensional object fixed in space, comprising, a follower adapted for movement in a plane of said object to scan the outline of said object in said plane, a reproducer for making an image of said outline, follower support means adapted to move said follower in said plane, reproducer support means, means movably mounting said follower and said reproducer each on a respective support means for movement relative thereto, motion duplicating means having a control point fixed in space, means mounting said follower support means and said reproducer support means on said motion duplicating means for bodily movement of said reproducer support means relative to said control point in duplication of bodily movement of said follower support means moving said follower in said plane, and control means interconnecting said follower and said reproducer for coordinated simultaneous movement of said reproducer relative to said reproducer support means with movement of said follower in said plane relative to said follower support means, said follower and reproducer being coordinatively movable relative to said respective support means concurrently with coordinated duplicated bodily movement of said follower support means and said reproducer support means relative to said control point.

2. Apparatus for reproducing surface outlines from a three-dimensional object fixed in space, comprising, a follower adapted for movement in a plane of said object to scan the outline of said object in said plane, a reproducer for making an image of said outline, a follower support arm for moving said follower in said plane, a reproducer support arm, means movably mounting said follower and said reproducer each on a respective support arm for movement relative thereto, pantograph motion duplicating means having a control point fixed in space, means mounting said follower support arm and said reproducer support arm on said pantograph for bodily movement of said reproducer support arm relative to said control point in duplication of bodily movement of said follower support arm moving said follower in said plane, and control means interconnecting said follower and said reproducer for coordinated simultaneous movement of said reproducer relative to said reproducer support arm with movement of said follower in said plane relative to said follower support arm, said follower and reproducer being coordinatively movable relative to said respective support arms concurrently with coordinated duplicated bodily movement of said follower support arm and said reproducer support arm relative to said control point.

3. Apparatus for reproducing surface outlines from a three-dimensional object fixed in space, comprising, a follower adapted for movement in a plane of said object to scan the outline of said object in said plane, a reproducer for making an image of said outline, a follower support arm for moving said follower in said plane, a reproducer support arm, means mounting said follower and said reproducer each on a respective support arm for rotation thereto, first pantograph motion duplicating means having a control point fixed in space, means mounting said follower support arm and said reproducer support arm on said pantograph means for bodily movement of said reproducer support arm relative to said control point in duplication of bodily movement of said follower support arm moving said follower in said plane, and second pantograph motion duplicating means interconnecting said follower and said reproducer for rotation of said reproducer relative to said reproducer support arm duplicating rotation of said follower in said plane relative to said follower support arm, said follower and reproducer being coordinatively rotatable relative to said respective support arms concurrently with coordinated duplicated bodily movement of said follower support means and said reproducer support means relative to control point.

4. Apparatus for reproducing surface outlines from a three-dimensional object fixed in space, comprising, a follower adapted for movement in a plane of said object to scan the outline of said object in said plane, a reproducer for making an image of said outline, a follower support arm for moving said follower in said plane, a reproducer support arm, means movably mounting said follower and said reproducer each on a respective support arm for rotation relative thereto, first and second pantograph motion duplicating linkage sets mounted for movement about a common control point, first means connecting each of said support arms to said first linkage set, second means connecting each of said support arms to said second linkage set at a point spaced from the connection to said first linkage set for bodily movement of said reproducer arm relative to said control point in duplication of bodily movement of said follower support arm moving said follower in said plane, and a third pantograph linkage set movable about said control point and interconnecting said follower and said reproducer for rotation of said reproducer relative to said reproducer support arm duplicating rotaton of said follower in said plane relative to said follower support arm, said follower and reproducer being coordinatively rotatable relative to said respective support arms concurrently with coordinated duplicated bodily movement of said follower support arm and said reproducer support arm relative to said control point.

References Cited by the Examiner

UNITED STATES PATENTS

| | | | |
|---|---|---|---|
| 36,212 | 8/1862 | Getz | 33—2 |
| 1,229,111 | 6/1917 | Macdonald | 33—2 |
| 1,418,614 | 6/1922 | Bennett | 33—2 |

FOREIGN PATENTS

| | | |
|---|---|---|
| 3,350 | 1905 | Great Britain. |

LEONARD FORMAN, *Primary Examiner.*

UNITED STATES PATENT OFFICE

CERTIFICATE OF CORRECTION

Patent No. 3,290,783 December 13, 1966

Richard F. Carella

It is hereby certified that error appears in the above numbered patent requiring correction and that the said Letters Patent should read as corrected below.

Column 1, line 17, for "two dimensional" read -- two-dimensional --; column 2, line 63, beginning with "sup-" strike out all to and including "within a" in column 3, line 3, and insert instead -- support arm, provided with a sprocket and meshed within a chain loop 72. The other end of the chain loop is received in a clevis formed similarly to that of the follower --; column 3, line 35, for "provision" read -- provisions --.

Signed and sealed this 19th day of September 1967.

(SEAL)
Attest:

ERNEST W. SWIDER
Attesting Officer

EDWARD J. BRENNER
Commissioner of Patents